(No Model.)
E. J. HEPBURN.
COFFEE POT.
No. 567,235. Patented Sept. 8, 1896.
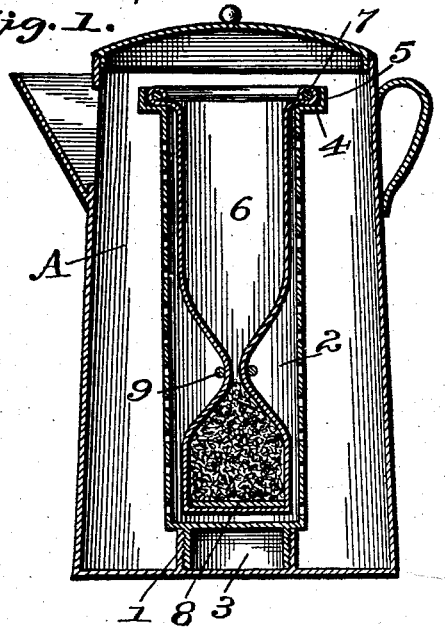
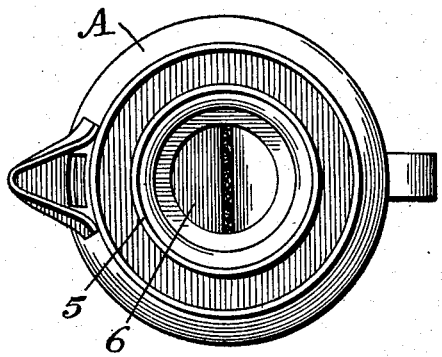
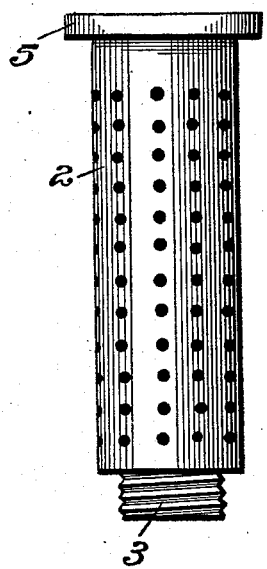
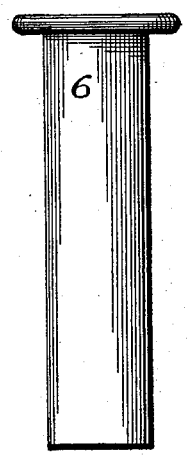
Witnesses
Edwin G. McKee
K. A. Nau
Inventor
Emmet J. Hepburn
By John Wedderburn
his Attorney

UNITED STATES PATENT OFFICE.

EMMET J. HEPBURN, OF FRANKLIN SQUARE, OHIO.

COFFEE-POT.

SPECIFICATION forming part of Letters Patent No. 567,235, dated September 8, 1896.

Application filed April 22, 1896. Serial No. 588,573. (No model.)

*To all whom it may concern:*

Be it known that I, EMMET J. HEPBURN, a citizen of the United States, residing at Franklin Square, in the county of Columbiana and State of Ohio, have invented certain new and useful Improvements in Coffee-Pots; and I do hereby declare the following to be a full, clear, and exact description of the invention, such as will enable others skilled in the art to which it appertains to make and use the same.

My invention relates to coffee-pots.

The object of the present invention is the provision of a coffee-pot of such peculiar construction that the coffee is prevented from circulating within the fluid, whereby coffee entirely free from grounds may be produced and the annoyance of clogging of the spout or nose of the pot obviated.

In the accompanying drawings, Figure 1 is a sectional side elevation of my complete coffee-pot; Fig. 2, a plan view of the coffee-pot with the cover removed; and Figs. 3, 4, and 5, detail views of the holder, the strainer, and the clamp, respectively.

A designates the coffee-pot proper, which is provided with the usual cover, spout, and handle.

To the bottom of the pot is secured an internally-screw-threaded cup 1.

The holder consists of an open perforated metal cylinder 2, provided with a screw-threaded lower end 3, adapted to engage with the cup 1, and having its upper end provided with a flange comprising an outwardly-extending base 4 and an upwardly-extending lip 5.

The strainer comprises a loosely-woven sack 6, having its mouth reinforced with a flanged metal ring 7 and its closed lower end connected to a metal disk 8. When the strainer is in position, it is inside of the holder and is held in vertical relation thereto by the metal ring 7 resting on the base 4 of the flange, the lip 5 preventing displacement of said ring. This strainer is adapted to hold the coffee, and I employ a clamp 9 for pinching the strainer at a point immediately above the coffee. This clamp may be of any form suitable for the purpose, but I prefer to employ a long and narrow "safety-pin" of the usual construction, as it is simple and can be easily adjusted.

The operation is as follows: When the parts are assembled as shown in Fig. 1, the coffee lies in the bottom of the strainer and the latter is tightly pinched immediately above the former by the clamp. This prevents the coffee from moving about. During boiling the water circulates freely through the perforations in the holder, the strainer, and the coffee, but the latter is held in one place and all of its flavor is drawn out.

Having thus described the invention, what is claimed as new is—

1. In a coffee-pot, the combination with the coffee-pot proper, of a strainer consisting of a suitable filtering fabric adapted to contain the coffee, and held within the coffee-pot and in the fluid, and a clamp adapted to pinch the strainer and prevent the coffee from moving about, substantially as described.

2. In a coffee-pot, the combination with the coffee-pot proper, of a perforated hollow cylindrical holder arising from the bottom of the coffee-pot, a strainer comprising a sack made of filtering fabric open at the top and adapted to hold the coffee submerged in the fluid, being suspended from the walls of the holder, and means for preventing the coffee from moving about within the strainer, substantially as described.

In testimony whereof I have signed this specification in the presence of two subscribing witnesses.

EMMET J. HEPBURN.

Witnesses:
HERMAN V. ZIMMERMAN,
DAVID I. BINGHAM.